(12) United States Patent
Ryu et al.

(10) Patent No.: US 11,655,323 B2
(45) Date of Patent: May 23, 2023

(54) POLY(AMIDE-IMIDE) COPOLYMER FILM AND METHOD FOR PREPARING SAME

(71) Applicant: LG CHEM, LTD., Seoul (KR)

(72) Inventors: Bi Oh Ryu, Daejeon (KR); Soonyong Park, Daejeon (KR); Youngseok Park, Daejeon (KR); Il Hwan Choi, Daejeon (KR); Young Ji Tae, Daejeon (KR); Kwanyeol Paek, Daejeon (KR)

(73) Assignee: LG CHEM, LTD., Seoul (KR)

( * ) Notice: Subject to any disclaimer, the term of this patent is extended or adjusted under 35 U.S.C. 154(b) by 468 days.

(21) Appl. No.: 16/636,233

(22) PCT Filed: Dec. 7, 2018

(86) PCT No.: PCT/KR2018/015472
§ 371 (c)(1),
(2) Date: Feb. 3, 2020

(87) PCT Pub. No.: WO2019/135500
PCT Pub. Date: Jul. 11, 2019

(65) Prior Publication Data
US 2020/0369816 A1   Nov. 26, 2020

(30) Foreign Application Priority Data

Jan. 3, 2018   (KR) .................. 10-2018-0000881
Dec. 3, 2018   (KR) .................. 10-2018-0153913

(51) Int. Cl.
*C08F 283/00*   (2006.01)
*C08J 5/18*   (2006.01)

(52) U.S. Cl.
CPC ............... *C08F 283/00* (2013.01); *C08J 5/18* (2013.01); *C08J 2379/08* (2013.01)

(58) Field of Classification Search
CPC ......... C08F 283/00; C08J 2379/08; C08J 5/18
See application file for complete search history.

(56) References Cited

U.S. PATENT DOCUMENTS

| | | |
|---|---|---|
| 5,728,799 A | 3/1998 | Oh |
| 2007/0149758 A1 | 6/2007 | Wang et al. |
| 2008/0049179 A1 | 2/2008 | Kawamoto et al. |
| 2009/0032995 A1 | 2/2009 | Mukunoki et al. |
| 2012/0296050 A1 | 11/2012 | Cho et al. |
| 2012/0320316 A1 | 12/2012 | Yanai et al. |
| 2015/0183931 A1 | 7/2015 | Fujii et al. |
| 2015/0299392 A1 | 10/2015 | Park et al. |
| 2015/0322218 A1* | 11/2015 | Choi .................. C08G 73/1039 525/436 |
| 2016/0146980 A1 | 5/2016 | Shin et al. |
| 2016/0194448 A1 | 7/2016 | Song et al. |
| 2016/0319076 A1 | 11/2016 | Ju et al. |
| 2017/0329062 A1 | 11/2017 | Nakajima et al. |
| 2018/0002486 A1 | 1/2018 | Kim et al. |
| 2018/0208766 A1 | 7/2018 | Nakayama et al. |
| 2019/0077915 A1 | 3/2019 | Yun et al. |
| 2021/0189067 A1 | 6/2021 | Ryu et al. |

FOREIGN PATENT DOCUMENTS

| | | | |
|---|---|---|---|
| CN | 104395376 A | 3/2015 | |
| CN | 104540883 A | 4/2015 | |
| CN | 105899581 A | 8/2016 | |
| CN | 107428962 A | 12/2017 | |
| EP | 3241859 A1 * | 11/2017 | ............. C08G 73/14 |
| EP | 3241859 A1 | 11/2017 | |
| JP | S59-204518 A | 11/1984 | |
| JP | H07-165915 A | 6/1995 | |
| JP | 2004-258544 A | 9/2004 | |
| JP | 2008-169363 A | 7/2008 | |
| JP | 2010-202714 A | 9/2010 | |
| JP | 2012-241196 A | 12/2012 | |
| JP | 2016-125063 A | 7/2016 | |
| JP | 2017-503887 A | 2/2017 | |
| JP | 2017-517582 A | 6/2017 | |
| JP | 2017-119868 A | 7/2017 | |
| JP | 2017-203984 A | 11/2017 | |
| JP | 2018-119133 A | 8/2018 | |
| JP | 6578581 B2 | 9/2019 | |
| KR | 10-1997-0006356 A | 2/1997 | |
| KR | 10-2006-0128945 A | 12/2006 | |
| KR | 10-2008-0002654 A | 1/2008 | |
| KR | 10-2008-0006500 A | 1/2008 | |
| KR | 10-2009-0013088 A | 2/2009 | |
| KR | 10-2009-0071036 A | 7/2009 | |
| KR | 10-2013-0013202 A | 2/2013 | |
| KR | 10-2013-0029129 A | 3/2013 | |
| KR | 10-1297516 B1 | 8/2013 | |
| KR | 10-2015-0076114 A | 7/2015 | |
| KR | 10-2016-0063539 A | 6/2016 | |
| KR | 10-2017-0136285 A | 12/2017 | |
| TW | 201742879 A | 12/2017 | |
| WO | 2015-099478 A1 | 7/2015 | |
| WO | 2017-010566 A1 | 1/2017 | |
| WO | WO-2017010566 A1 * | 1/2017 | ......... C08G 73/1007 |

OTHER PUBLICATIONS

PCT Search Report & Written Opinion issued for PCT Application No. PCT/KR2018/015472 dated Mar. 18, 2019, 11 pages.
Extended European Search Report issued for European Patent Application No. 18898057.7 dated Apr. 24, 2020, 9 pages.

* cited by examiner

*Primary Examiner* — Robert D Harlan
(74) *Attorney, Agent, or Firm* — Rothwell, Figg, Ernst & Manbeck, P.C.

(57) ABSTRACT

The present invention relates to an aromatic poly(amide-imide) copolymer film having high retardation in the thickness direction and exhibiting a low moisture absorption rate, and a method for preparing the same.

10 Claims, No Drawings

POLY(AMIDE-IMIDE) COPOLYMER FILM AND METHOD FOR PREPARING SAME

CROSS-REFERENCE TO RELATE APPLICATION(S)

This application is a 35 U.S.C. § 371 National Stage of International Patent Application No. PCT/KR20181015472, filed on Dec. 7, 2018, designating the United States, which claims the benefit of filing dates of Korean Patent Application No. 10-2018-0000881 filed with Korean Intellectual Property Office on Jan. 3, 2018 and Korean Patent Application No. 10-2018-0153913 filed with Korean Intellectual Property Office on Dec. 3, 2018, the entire contents of which are incorporated herein by reference.

TECHNICAL FIELD

The present invention relates to an aromatic poly(amide-imide) copolymer film and a method for preparing the same.

Background Art

The aromatic polyimide resin is a polymer mostly having an amorphous structure, and exhibits excellent heat resistance, chemical resistance, electrical characteristics, and dimensional stability due to its rigid chain structure.

Such a polyimide resin is widely used for electric/electronic materials.

However, the polyimide resin has many limitations in use, because it is dark brown due to the formation of a CTC (charge transfer complex) of π electrons present in the imide chain.

In order to solve the limitations and obtain a colorless transparent polyimide resin, a method of restricting the movement of the π electrons by introducing a strong electron attracting group such as a trifluoromethyl ($-CF_3$) group; a method of reducing the formation of the CTC by introducing a sulfone ($-SO_2-$) group, an ether ($-O-$) group, or the like into the main chain to make a bent structure; or a method of inhibiting the formation of the resonance structure of the π electrons by introducing an aliphatic cyclic compound, have been proposed.

However, it is difficult for the polyimide resin according to the aforementioned proposals to exhibit sufficient heat resistance due to the bending structure or the aliphatic cyclic compound, and a film prepared using the same still has limitations such as poor mechanical properties.

Recently, in order to improve the scratch resistance of polyimide, an aromatic poly(amide-imide) copolymer having an introduced polyamide unit structure has been developed.

However, when a polyamide unit structure is introduced into a polyimide, the scratch resistance is improved, but them has been a limit to the securement of the UV shielding function.

Therefore, there is still a demand for the development of aromatic poly(amide-imide) copolymers capable of improving scratch resistance and mechanical properties and simultaneously improving the W shielding function.

DETAILED DESCRIPTION OF THE INVENTION

The present invention provides an aromatic poly(amide-imide) copolymer film having an improved L shielding function while exhibiting excellent scratch resistance and mechanical properties.

The present invention also provides a method for preparing the aforementioned aromatic poly(amide-imide) copolymer film.

There is provided an aromatic poly(amide-imide) copolymer film in which retardation (Rth) in the thickness direction at a wavelength of 550 nm is 3000 nm or more, and a moisture absorption rate according to the following General Formula 1 is 3.6% or less.

Moisture Absorption Rate (%)=($W1-W2$)*100/$W$[General Formula 1]

in General Formula 1, W1 is a weight measured by impregnating the aromatic poly(amide-imide) copolymer film in ultrapure water for 24 hours, and W2 is a weight measured by drying the aromatic poly(amide-imide) copolymer film after at 150° C. for 30 minutes after the impregnation.

There is also provided a method for preparing the aromatic poly(amide-imide) copolymer film including the steps of: reacting an aromatic diamine monomer, an aromatic dianhydride monomer, and an aromatic dicarbonyl monomer to form an aromatic poly(amide-imide) copolymer and coating a coating solution formed by dissolving the aromatic poly(amide-imide) copolymer in an amide solvent containing an aliphatic group having 3 or mom carbon atoms onto a substrate.

Hereinafter, an aromatic poly(amide-imide) copolymer film according to a specific embodiment of the invention and a method for producing the same will be described in mom detail.

According to one embodiment of the invention, an aromatic poly(amide-imide) copolymer film in which retardation (Rth) in the thickness direction at a wavelength of 550 nm is 3000 nm or more, and a moisture absorption rate according to General Formula 1 is 3.6% or less, can be provided.

The present inventors found through experiments that a polymer film produced by using an aromatic poly(amide-imide) copolymer formed from an aromatic monomer and applying the preparation method described later can satisfy the physical properties that retardation (Rth) in the thickness direction at a wavelength of 550 nm is 3000 nm or more, and a moisture absorption rate according to General Formula 1 is 3.6% or less, thereby completing the present invention.

In the aromatic poly(amide-imide) copolymer film of this embodiment, the retardation (Rth) in the thickness direction at a wavelength of 550 nm in an unstretched state may be 3000 nm or more, or 3000 nm to 4500 m. Consequently, the yellowness index and the haze value are lowered, the mechanical strength can be improved according the orientation of the polymer in the film, and the moisture absorbing performance can be lowered.

In addition, the aromatic poly(amide-imide) copolymer film of the embodiment may have a moisture absorption rate according to General Formula 1 of 3.6% or less or 2.0 to 3.6%. As it satisfies the moisture absorption rate within the above range together with the above-mentioned retardation (Rth) value in the thickness direction, the yellowness index and the haze value are lowered, the mechanical strength can be improved according the orientation of the polymer in the film, and the moisture absorbing performance can be lowered.

The retardation (Rth) in the thickness direction can be confirmed by a commonly known measurement method and measurement apparatus.

For example, the retardation (Rth) in the thickness direction can be determined using a measuring apparatus manufactured by AXOMERICS, Inc. under the trade name of "AxoScan", Prism Coupler, and the like.

In addition, the retardation (Rth) in the thickness direction can be determined by: inputting a value of a refractive index (550 nm) of the polyamide-imide resin film into the measuring apparatus, then measuring the thickness-direction retardation of the polyamide-imide resin film by using light at a wavelength of 590 nm under conditions of a temperature of 25° C. and humidity of 40%; and converting the measured value of the thickness-direction retardation thus determined (the value is measured according to the automatic measurement (automatic calculation) of the measuring apparatus) into a retardation value per 10 µm of the thickness of the film.

In addition, the size of the polyimide film as the measurement sample is not particularly limited, as long as it is larger than a light measurement unit (diameter: about 1 cm) of a stage of the measuring apparatus. However, the size may be a length of 76 mm, a width of 52 mm, and a thickness of 13 M.

The value of the "refractive index (550 nm) of the polyimide film" utilized in the measurement of the thickness-direction retardation (Rth) can be determined by forming an unstretched film including the n kind of polyamide-imide resin film as the polyamide-imide resin film for forming the film to be measured for the retardation and then measuring the unstretched film as a measurement sample (in the case where the film to be measured is an unstretched film, the film can be directly used as the measurement sample) for the refractive index for light at 550 nm in an in-plane direction (the direction perpendicular to the thickness direction) of the measurement sample by using a refractive index-measuring apparatus (manufactured by Atago Co., Ltd. under the trade name of "NAR-1T SOLID") as a measuring apparatus under a light source of 550 nm and a temperature condition of 23° C.

Further, when the measurement sample is unstretched, the refractive index in the in-plane direction of the film is the same in any direction in the plane, and measuring this refractive index makes it possible to measure the intrinsic refractive index of the polyamide-imide resin film (further, since the measurement sample is unstretched, Nx=Ny is satisfied, where Nx is a refractive index in a direction of a slow axis in the plane, and Ny is a refractive index in an in-plane direction perpendicular to the direction of the slow axis).

In this way, an unstretched film is utilized to measure the intrinsic refractive index (550 nm) of the polyamide-imide resin film, and the measurement value thus obtained is utilized in the measurement of the above-described thickness-direction retardation (Rth).

Hem, the size of the polyamide-imide resin film as a measurement sample is not particularly limited, as long as the size can be utilized in the refractive index-measuring apparatus. The size may be 1 cm square (1 cm in length and width) and 13 µm in thickness.

Generally, a polymeric resin film having a rigid internal structure may have relatively high haze or yellowness index or low light transmittance.

On the contrary, the aromatic poly(amide-imide) copolymer film of the embodiment exhibits thickness-direction retardation (Rth) described above and has a moisture absorption rate of 3.6% or less even while having a crystalline rigid internal structure, thereby preventing moisture penetration and the like, and having a low haze value and high light transmittance.

For this reason, the aromatic poly(amide-imide) copolymer film can have higher mechanical strength while having a lower yellowness index and haze value.

More specifically, the aromatic poly(amide-imide) copolymer film may have a thickness of 1 µm to 100 µm, and within such thickness range, it may have haze of 2% or less and visible light transmittance of 98% or more.

On the other hand, the aromatic poly(amide-imide) copolymer film of the embodiment can be obtained by forming a copolymer using a predetermined aromatic monomer, then dissolving the copolymer formed as in the preparation method described later in a solvent containing an aliphatic group having 3 or more carbon atoms and then coating the solution. It may also have the above-described characteristics depending on the selection of these monomers and the specific preparation method.

Specifically, the aromatic poly(amide-imide) copolymer film may include an aromatic poly(amide-imide) copolymer between an aromatic diamine monomer, an aromatic dianhydride monomer, and an aromatic dicarbonyl monomer, and such aromatic poly(amide-imide) copolymer may be an imidation product of a polyamic acid in which an aromatic diamine monomer, an aromatic dianhydride monomer, and an aromatic dicarbonyl monomer are copolymerized.

More specifically, in the aromatic poly(amide-imide) copolymers, the repeating unit derived from the aromatic dicarbonyl monomer may be contained in an amount of 51 mol % or mom based on the total moles of the repeating units derived from the aromatic dianhydride monomer and the aromatic dicarbonyl monomer.

The repeating unit derived from the aromatic dicarbonyl monomer may include 10 to 60 mol % of 4,4-biphenyldicarbonyl repeating units, 10 to 50 mol % of isophthaloyl repeating units, and 20 to 70 mol % of terephthaloyl repeating units.

Depending on the specific composition of the aromatic poly(amide-imide) copolymer, a polymer film having an excellent UV shielding function while exhibiting excellent scratch resistance and high mechanical properties can be provided. More specifically, by including the aromatic dicarbonyl monomer having a specific composition, the aromatic poly(amide-imide) copolymer film of this embodiment can have a high UV-cut slope with improved mechanical properties, and have colorless transparent optical properties.

The aromatic poly(amide-imide) copolymer contained in the aromatic poly(amide-imide) copolymer film of the embodiment may be a block copolymer or a random copolymer.

For example, the aromatic poly(amide-imide) copolymer may include a first unit structure derived from copolymerization of the aromatic diamine monomer and the aromatic dianhydride monomer, and a second unit structure derived from copolymerization of the aromatic diamine monomer and the aromatic dicarbonyl monomer.

Further, the aromatic polyamide-imide may include a unit structure in which the aromatic diamine monomer, the aromatic dianhydride monomer, and the aromatic dicarbonyl monomer may form an amide bond, respectively, and am randomly copolymerized.

Such a polyamic acid forms an aromatic poly(amide-imide) copolymer simultaneously having imide bonds and amide bonds by imidization.

As described above, in the aromatic poly(amide-imide) copolymers, the repeating unit derived from the aromatic dicarbonyl monomer may be contained in an amount of 51 mol % or more based on the total moles of the repeating units derived from the aromatic dianhydride monomer and the aromatic dicarbonyl monomer.

When the repeating unit derived from the aromatic dicarbonyl monomer is contained in an amount of less than 51 mol % based on the total moles of the repeating units derived from the aromatic dianhydride monomer and the aromatic dicarbonyl monomer, the hydrogen bonding force is relatively reduced inside the aromatic poly(amide-imide) copolymer film, and also mechanical properties such as surface hardness, elastic modulus, and tensile strength, as well as optical properties such as yellowness index and transmittance, may be lowered.

The maximum value of the content of the repeating unit derived from the aromatic dicarbonyl monomer relative to the total moles of the repeating units derived from the aromatic dianhydride monomer and the aromatic dicarbonyl monomer is not particularly limited, and it may be, for example, 90 mol % or less, 85 mol % or less, or 80 mol % or less.

The aromatic dicarbonyl monomer is composed of 4,4'-biphenyldicarbonyl chloride (BPC), isophthaloyl chloride (M), and terephthaloyl chloride (TPC).

The isophthaloyl chloride (IPC) and terephthaloyl chloride (TPC) are compounds in which two carbonyl groups are bonded to either meta or para positions in a central phenylene group.

When such isophthaloyl chloride (IPC) and terephthaloyl chloride (TPC) are used as the aromatic dicarbonyl monomers, it is possible to exhibit an advantageous effect in improving the processability due to the meta bond in the copolymer and improving the mechanical properties due to the para bond, but there has been a limit to the securement of UV-cut performance.

In this regard, when the aforementioned 4,4'-biphenyldicarbonyl chloride (BPC), which is a compound in which two carbonyl groups are bonded to the para position in the central biphenylene group, is further used as the aromatic dicarbonyl monomer, the 4,4'-biphenyldicarbonyl chloride (BPC) has higher crystallinity than the isophthaloyl chloride (IPC) and terephthaloyl chloride (TPC), and therefore it is possible to further increase the hardness of the aromatic poly(amide-imide) copolymer and simultaneously increase the UV-cut slope.

Further, in the aforementioned aromatic poly(amide-imide) copolymers, the repeating unit derived from the aromatic dicarbonyl monomer may include 10 to 60 mol % of 4,4'-biphenyldicarbonyl repeating units, 10 to 50 mol % of isophthaloyl repeating units, and 20 to 70 mol % of terephthaloyl repeating units.

4,4'-Biphenyldicarbonyl chloride (BPC), isophthaloyl chloride (1), and terephthaloyl chloride (TPC), which constitute the aromatic dicarbonyl monomer, can improve the hardness and mechanical properties and improve the ultraviolet shielding function while maintaining the transparency and yellowness index of the aromatic poly(amide-imide) copolymer within the above molar ratio range.

In particular, when the 4,4'-biphenyl dicarbonyl chloride (BPC) is contained in an amount of less than 10 mol % based on the total moles of the aromatic dicarbonyl monomer, the effect of improving scratch resistance and mechanical properties is insufficient, and when it is contained in an amount exceeding 60 mol %, there may be a problem that the film has high haze after coating and curing.

Thus, the 4,4'-biphenyldicarbonyl chloride (BPC) may be contained in an amount of 10 mol % or more, 12 mol % or more, or 14 mol % or more, and 60 mol % or less or 55 mol % or less, based on the total moles of the aromatic dicarbonyl monomer.

In addition, the isophthaloyl chloride (IPC) may be contained in an amount of 10 mol % or more or 14 mol % or more, and 50 mol % or less, based on the total moles of the aromatic dicarbonyl monomer.

In addition, the terephthaloyl chloride (TPC) may be contained in an amount of 20 mol % or more or 35 mol % or more, and 60 mol % or less or 55 mol % or less, based on the total moles of the aromatic dicarbonyl monomer.

In the aromatic poly(amide-imide) copolymer, the molar ratio of (the aromatic diamine monomer) to (the aromatic dianhydride monomer and the aromatic dicarbonyl monomer) may be 1:0.95 to 1:1.05.

Specifically, in the aromatic poly(amide-imide) copolymer, the molar ratio of (the aromatic diamine monomer) to (the aromatic dianhydride monomer and the aromatic dicarbonyl monomer) may be 1:1.

As described above, in an aromatic poly(amide-imide) copolymer according to one embodiment, when the composition of the aromatic dicarbonyl monomer satisfies the above two conditions at the same time, it is possible to exhibit excellent hardness and mechanical properties, excellent scratch resistance (high grade of pencil hardness), and excellent UV shielding function.

The aromatic diamine monomer may be 2,2'-bis(trifluoromethyl)-4,4'-biphenyldiamine (TFDB), or 1,3-cyclaexanediamine (13CHD).

Among them, it is preferable to use 2,2'-bis(trifluoromethyl)-4,4'-biphenyldiamine (TFDB) as the aromatic diamine monomer from the viewpoint of improving hardness and maintaining a low yellowness index Further, the aromatic dianhydride monomer may be 3,3',4,4'-biphenyltetracarboxylic acid dianhydride (BPDA), cyclobutane-1,2,3,4-tetracarboxylic dianhydride (CBDA), or 2,2'-bis(3,4-dicarboxyphenyl)hexaluopopmane dianhydride (6FDA).

Among them, 3,3',4,4'-biphenyltetracarboxylic acid dianhydride or cyclobutane-1,2,3,4-tetrcarboxylic dianhydride is preferably used as the aromatic dianhydride monomer from the viewpoint of improving hardness, UV shielding property. UV weathering resistance, and chemical imidization processability.

Meanwhile, the aromatic poly(amide-imide) copolymer film is dispersed in the polymer substrate containing the aromatic poly(amide-imide) copolymer.

Examples of the ultraviolet absorber include benzotriazole-based compounds, benzophenone-based compounds, benzoate-based compounds, cyanoacrylate-based compounds, salicylic acid ester-based compounds, oxybenzophenone-based compounds, triazine-based compounds, inorganic compounds, and the like, but the present invention is not limited thereto.

Here, examples of the aforementioned benzotriazole-based compound include 2-(7-hydroxyphenyl)benzotriazole, 2-(2'-hydroxy-5'-methylphenyl)benzotriazole, 2-(2-hydroxy-5'-methylphenyl)-5-carboxylic acid butyl ester benzotriazole, 2-(2'-hydroxy-5'-methylphenyl)-5,6-dichlorobenzothiazole, 2-(2'-hydroxy-5'-methylphenyl)-5-ethyl sulfone benzotriazole, 2-(2-hydroxy-5'-t-butylphenyl)-5-chlorobenzotriazole, 2-(2'-hydroxy-5-t-butylphenyl)benzotriazole, 2-(2'-hydroxy-5-aminophenyl)benzotriazole, 2-(2'-hydroxy-3'S-dimethylphenyl)benzotriazole, 2-(2'-hydroxy-3'S-dimethylphenyl)-5-methoxybenzotriazole, 2-(2'-methyl-4-hydroxyphenyl)benzotriazole, 2-(2'-stearyloxy-3'S-dimethylphenyl)-5-methylbenzotriazole, 2-(2'-hydroxy- 5-carboxylic acid phenyl)benzotriazole ethyl ester, 2-(2'-hydroxy-3,5'-di-t-butylphenyl)-5-chlorobenzotriazole, 2-(2'-hydroxy-3'-methyl-5'-t-butylphenyl)-5-chlorobenzotriazole, 2-(2'-hydroxy-3'-t-butyl-5'-methylphenyl)-5-chlorobenzotriazole, 2-(2'-hydroxy-5'-methoxyphenyl)benzotriazole, 2-(2'-hydroxy-3'5'-di-t-butylphenyl)-5-chlorobenzotriazole, 2-(2-hydroxy-4'-cyclohexylphenyl)benzotriazole, 2-(2'-hydroxy-4',5'-dimethylphenyl)-5-carboxylic acid benzotriazole, 2-(2'-hydroxy-5-methylphenyl)-5-carboxylic acid butyl eater benzotriazole, 2-(2'-hydroxy-4'5'-dichlorophenyl)benzotriazole, 2-(2'-hydroxy-3'5-dimethylphenyl)-5-ethylsulfobenzotriazole, 2-(2'-hydroxy-4-octyloxyphenyl)benzotriazole, 2-(2'-hydroxy-5'-methoxyphenyl)-5-methylbenzotriazole, 2-(2-hydroxy-5'-methylphenyl)-5-carboxylic acid ester benzotriazole, 2-(7-acetoxymethylphenyl)benzotriazole, and the like.

Examples of the benzophenone-based compound include 2-hydroxy-4-methoxy benzophenone, 2,4-dihydroxy benzophenone, 2-hydroxy-4-n-octoxy benzophenone, 2-hydroxy-4-methoxy-2'-carboxy benzophenone, 2,2-dihydroxy-4,4'-dimethoxy benzophenone, 2-hydroxy-4-benzoyloxy benzophenone, 2,2'-dihydroxy-4-methoxy benzophenone, 2-hydroxy-4-methoxy-5-sulfone benzophenone, 2,2',4,4'-tetrahydroxy benzophenone, 2,2'-dihydroxy-4,4-dimethoxy benzophenone, 2-hydroxy-5-chlorobenzophenone, bis-(2-methoxy-4-hydroxy-5-benzoylphenyl)methane, and the like.

Examples of the benzoate-based compound include phenyl salicylate, 4-t-butylphenyl salicylate, 2,5-t-butyl-4-hydroxybenzoic acid, n-hexadecyl ester, 2,4-di-t-butylphenyl-3,5-di-t-butyl-4-hydroxybenzoate and the like.

Further, examples of the cyanoacrylate-based compound include ethyl-2-cyano-3,3-diphenylacrylate.

Examples of the salicylic acid ester compound include phenyl salicylate and 4-t-butylphenyl salicylate.

Examples of the oxybenzophenone-based compound include 2-hydroxy-4-methoxybenzophenone and 2-hydroxy-4-n-octoxybenzophenone.

Examples of the triazine-based compound include 2-(4,6-diphenyl-1,3,5-triazine-2-yl)-5-[(hexyl)oxy]-phenol.

Examples of the inorganic compound include titanium oxide, zinc oxide, cerium oxide, iron oxide, barium sulfate, and the like.

Among the specific examples, one or more aromatic compounds selected from the group consisting of 2-(2-hydroxy-5'-tert-octylphenyl)benzotriazole and octadecyl-3-(3,5-di-tert-butyl-4-hydroxyphenyl)-propionate can be further included.

Such an aromatic compound may be added in the process of the preparation of the aromatic poly(amide-imide) copolymer film, and thus the yellowness index and haze of the aromatic poly(amide-imide) copolymer film can be lowered, and the moisture absorption properties can be improved while improving the mechanical properties.

The one or more aromatic compounds selected from the group consisting of 2-(7-hydroxy-5-tert-octylphenyl)benzotriazole and octadecyl-3-(3,5-di-tert-butyl-4-hydroxyphenyl)-propionate may be contained in an amount of 0.001 to 10 parts by weight based on 100 part by weight of the polymer substrate including the aromatic poly(amide-imide) copolymer.

The aromatic poly(amide-imide) copolymer has a weight average molecular weight of 10,000 to 1,000,000 g/mol, 50,000 to 1,000,000 g/mol, 50,000 to 500,000 g/mol, or 50,000 to 300,000 g/mol.

Specifically, the aromatic poly(amide-imide) copolymer may have pencil hardness of 2H or more, as measured for a specimen having a thickness of 25 to 55 μm according to ASTM D3363.

In addition, the aromatic polyamide-imide may have tensile strength of 180 MPa or more as measured for a specimen having a thickness of 25 to 55 μm according to ASTM D638.

Preferably, the tensile strength may be 190 MPa or mom, 200 MPa or more, or 220 MPa or more.

The higher the tensile strength, the better the mechanical properties, and thus the upper limit is not particularly limited, but it may be, for example, 300 MPa or less, 280 MPa or less, or 270 MPa or less.

In addition, the aromatic polyamide-imide has tensile elongation of 18% or morn, as measured for a specimen having a thickness of 25 to 55 μm according to ASTM D638.

Preferably, the tensile elongation may be 20% or more, 22% or more, or 25% or more.

The higher the tensile elongation, the better the mechanical properties, and thus the upper limit is not particularly limited, but may be, for example, 35% or less, 33% or less, or 30% or less.

Further, in the aromatic polyamide-imide, a UV-cut slope (dT/dλ) measured for a specimen having a thickness of 25 to 55 μm according to ASTM E424 may be 2.80 or more in the range of transmittance of 10 to 80%.

Further, at this time, the UV-cut off wavelength (wavelength when the transmittance is less than 1%) may be 353 nm to 355 nm.

On the other hand, according to another embodiment of the invention, a method for preparing the aromatic poly(amide-imide) copolymer film can be provided, including the steps of: reacting an aromatic diamine monomer, an aromatic dianhydride monomer, and an aromatic dicarbonyl monomer to form an aromatic poly(amide-imide) copolymer, and coating a coating solution formed by dissolving the aromatic poly(amide-imide) copolymer in an amide solvent containing an aliphatic group having 3 or more carbon atoms onto a substrate.

An aromatic poly(amide-imide) copolymer film having the above-mentioned characteristics can be provided by reacting an aromatic diamine monomer, an aromatic dianhydride monomer, and an aromatic dicarbonyl monomer to form an aromatic poly(amide-imide) copolymer, dissolving the copolymer in an amide solvent containing an aliphatic group having 3 or more carbon atoms, and then coating it.

The details of the aromatic diamine monomer, the aromatic dianhydride monomer, and the aromatic dicarbonyl monomer am as described above.

The polymerization conditions for forming the aromatic poly(amide-imide) copolymer am not particularly limited, and for example, the copolymer may be formed by forming a polyamic acid using the aromatic diamine monomer, the aromatic dianhydride monomer, and the aromatic dicarbonyl monomer, and imidizing it.

The polymerization for the formation of the polyamic acid can be carried out by solution polymerization at 0 to 100° C. in an inert atmosphere.

As the solvent for forming the polyamic acid, N,N-dimethylformamide, dimethylacetamide, dimethyl sulfoxide, acetone, N-methyl-2-pyrrolidone, tetrahydrofuran, chloroform, gamma-butyrolactone, and the like can be used.

Imidization after formation of the polyamic acid can be carried out thermally or chemically.

For example, compounds such as acetic anhydride and pyridine may be used for chemical imidization.

Meanwhile, as described above, in the aromatic poly(amide-imide) copolymer film produced by costing a coating solution formed by dissolving the aromatic poly(amide-imide) copolymer in an amide solvent containing an aliphatic group having 3 or more carbon atoms onto a substrate, the retardation (Rth) in the thickness direction at the wavelength of 550 nm in an unstretched state may be 3000 nm or morn, and a moisture absorption rate according to General Formula 1 may be 3.6% or less.

In addition, the aromatic poly(amide-imide) copolymer film may have haze of 2% or less and visible light transmittance of 98% or more at a thickness of 1 μm to 100 μm.

The properties of such an aromatic poly(amide-imide) copolymer film appear to be attributed to the use of the amide solvent including an aliphatic group having 3 or mom carbon atoms as described above.

Mom specifically, the above-mentioned amide solvent containing an aliphatic group having 3 or more carbon atoms can enhance the solubility of the polyamide-imide polymer and have an advantageous effect on the orientation of the polymer during costing and drying. Thus, a film formed from the aromatic poly(amide-imide) copolymer can have characteristics such as a low yellowness index and haze index, high mechanical strength, and a low hygroscopic property.

Specific examples of the amide solvent containing the aliphatic group having 3 or more carbon atoms include methyl 3-methoxypropionate, 3-methoxy-N,N-dimethyl propionamide, or N,N-dimethylpropionamide.

Further, as described above, the aromatic poly(amide-imide) copolymer film may have the above-described characteristics depending on the specific monomers used in the synthesis of the aromatic poly(amide-imide) copolymer and the content thereof.

Specifically, the aromatic dicarbonyl monomer may be contained in an amount of 51 mol % or more based on the total moles of the aromatic dianhydride monomer and the aromatic dicarbonyl monomer.

Further, the aromatic dicarbonyl monomer may include 10 to 60 mol % of 4,4'-biphenyldicarbonyl chloride, 10 to 50 mol % of isophthaloyl chloride, and 20 to 70 mol % of terephthaloyl chloride.

The costing liquid formed by dissolving the aromatic poly(amide-imide) copolymer in an amide solvent containing an aliphatic group having 3 or more carbon atoms may further include one or more aromatic compounds selected from the group consisting of 2-(2'-hydroxy-5'-tert-octylphenyl)benzotriazole and octadecyl-3-(3,5-di-tert-butyl-4-hydroxyphenyl)-propionate.

Such aromatic compound can be dispersed in a polymer substrate including the aromatic poly(amide-imide) copolymer within the finally produced aromatic poly(amide-imide) copolymer film, and thus the film formed from the aromatic poly(amide-imide) copolymer may have characteristics such as a low yellowness index and haze index, high mechanical strength, and a low hygroscopic property.

The method of coating the coating solution formed by dissolving the aromatic poly(amide-imide) copolymer in an amide solvent containing an aliphatic group having 3 or mom carbon atoms is not particularly limited, and for example, conventionally known coating methods and apparatuses can be used in the temperature range of 5° C. to 80° C.

The type of the substrate is not limited, and for example, ordinary organic and inorganic substrates, or various substrates such as glass substrates, paper substrates, polymer substrates, and metal substrates, can be used.

Advantageous Effects

The aromatic poly(amide-imide) copolymer according to the present invention makes it possible to provide a poly (amide-imide) copolymer film having an improved UV shielding function while exhibiting excellent scratch resistance and mechanical properties.

DETAILED DESCRIPTION OF THE EMBODIMENTS

Hereinafter, preferred examples am presented to facilitate understanding of the present invention. However, the following examples am given for illustrative purposes only, and the scope of the present invention is not intended to be limited to or by these examples.

EXAMPLES AND COMPARATIVE EXAMPLES: PREPARATION OF POLY(AMIDE-IMIDE) COPOLYMER FILM

Comparative Example 1

A 100 mL 4-neck round-bottom flask (reactor) equipped with a stirrer, a nitrogen injector, a dropping funnel, a temperature controller, and a cooler was filled with 42.5 g of N,N-dimethylacetamide (DMAc) while supplying nitrogen, and then the temperature of the reactor was adjusted to 25° C. 4.3413 g (0.01355 mol) of 2,2'-bis(trifluoromethyl)-4,4-biphenyldiamine (TFDB) was added and dissolved, and this solution was maintained at 25° C.

Thereto, 0.0213 g (0.0001 mol) of cyclobutane-1,2,3,4-tetracarboxylic dianhydride (CBDA) was added, and then stirred for a predetermined time and allowed to dissolve and react.

After the temperature of the solution was cooled to −10° C., 1.5136 g (0.005422 mole) of biphenyl dicarbonyl chloride (BPC), 0.5505 (0.00271 mol) of isophthaloyl chloride (IPC), and 1.0734 g (0.0029 mol) of terephthaloyl chloride (T) were added and stirred, respectively.

A polyamic acid solution having a solid content concentration of 15% by weight was obtained.

DMAC was added to the polyamic acid solution, diluted to a solid content of 5% or less, and precipitated with 10 L of methanol. The precipitated solid component was filtered and then vacuum dried at 100° C. for 6 hours or more to obtain a poly(amide-imide) copolymer (Co-PMI #1) in the form of a solid component (weight average molecular weight determined by GPC of about 147,211 g/mol).

The obtained poly(amide-imide) copolymer (Co-PM #1) was dissolved in N,N-dimethylpropionamide to prepare an approximate 15 wt % polymer solution.

The polymer solution was poured into a plastic substrate (UPILEX-75s, UBE Industries), and the thickness of the polymer solution was uniformly adjusted using a film applicator, dried in a Matiz oven at 80° C. for 10 minutes, and then cured at 250° C. for 30 minutes under a nitrogen pure to obtain a PAI film having a thickness of 50.0 μm peeled from the substrate.

Example 1

5 parts by weight of octadecyl-3-(3,5-di-tert-butyl-4-hydroxyphenyl)-propionate (Irganox 1076) as an aromatic compound relative to 100 parts by weight of the poly(amide-imide) copolymer (Co-PM #1) obtained in Comparative Example 1 was dissolved in N,N-dimethylpropionamide to prepare an approximate 15 wt % polymer solution.

The polymer solution was poured into a plastic substrate (UPILEX-75s, UBE Industries), and the thickness of the polymer solution was uniformly adjusted using a film applicator, dried in a Matiz oven at 80° C. for 10 minutes, and then cured at 250° C. for 30 minutes under a nitrogen purge to obtain a PAI film having a thickness of 50.0 μm peeled from the substrate.

Example 2

5 parts by weight of pentaerythritol tetrakis(3-(3,5-di-tert-butyl-4-hydroxyphenyl)propionate) (Irganox 1010) as an aromatic compound relative to 100 parts by weight of the poly(amide-imide) copolymer (Co-PM #1) obtained in Comparative Example 1 was dissolved in N,N-dimethylpropionamide to prepare an approximate 15 wt % polymer solution.

The polymer solution was poured into a plastic substrate (UPILEX-75s, UBE Industries), and the thickness of the polymer solution was uniformly adjusted using a film applicator, dried in a Matiz oven at 80° C. for 10 minutes, and then cured at 250° C. for 30 minutes under a nitrogen purge to obtain a PAI film having a thickness of 50.0 μm peeled from the substrate.

Example 3

5 parts by weight of pentaerythritol tetras(3-(3,5-di-tert-butyl-4-hydroxyphenyl)propionate) (Irganox 1010) as an aromatic compound relative to 100 parts by weight of the poly(amide-imide) copolymer (Co-PM #1) obtained in Comparative Example 1 was dissolved in N,N-dimethylpropionamide to prepare an approximate 15 wt % polymer solution.

The polymer solution was poured into a plastic substrate (UPILEX-75s, UBE Industries), and the thickness of the polymer solution was uniformly adjusted using a film applicator, dried in a Matiz oven at 60° C. for 20 minutes, and then cured at 250° C. for 30 minutes under a nitrogen purge to obtain a PAI film having a thickness of 50.0 μm peeled from the substrate.

Comparative Example 2

A 100 mL 4-neck round-bottom flask (reactor) equipped with a stirrer, a nitrogen injector, a dropping funnel, a temperature controller, and a cooler was filed with 42.5 g of N,N-dimethylacetamide (DMAc) while supplying nitrogen, and then the temperature of the reactor was adjusted to 25° C. 4.505 (0.014067 mol) of TFDB was added and dissolved, and this solution was maintained at 25° C. Thereto, 0.0201 g (0.0001 mol) of CBDA was added, and then stirred for a predetermined time and allowed to dissolve and react.

After the temperature of the solution was cooled to −10° C., 0.5355 g (0.00263 mol) of IPC and 2.44 g (0.012 mol) of TPC we added and stirred, respectively. A polyamic acid solution having a solid content concentration of 15% by weight was obtained.

DMAC was added to the polyamic acid solution, diluted with a solid content of 5% or less, and precipitated with 10 L of methanol. The precipitated solid component was filtered and then vacuum dried at 100° C. for 6 hours or more to obtain a poly(amide-imide) copolymer (Co-PM #2) in the form of a solid component (weight average molecular weight determined by GPC of about 154,197 g/mol).

The obtained poly(amide-imide) copolymer (Co-PM #2) was dissolved in N,N-dimethylpropionamide to prepare an approximate 15 wt % polymer solution.

The polymer solution was poured into a plastic substrate (UPILEX-75s, UBE Industries), and the thickness of the polymer solution was uniformly adjusted using a film applicator, dried in a Matiz oven at 120° C. for 15 minutes, and then cured at 250° C. for 30 minutes under a nitrogen pure to obtain a PAI film having a thickness of 49.8/m peeled from the substrate.

Example 4

5 parts by weight of octadecyl-3-(3,5-di-tert-butyl-4-hydroxyphenyl)-propionate(Irganox 1076) as an aromatic compound relative to 100 parts by weight of the poly(amide-imide) copolymer (Co-PM #2) obtained in Comparative Example 2 was dissolved in N,N-dimethylpropionamide to prepare an approximate 15 wt % polymer solution.

The polymer solution was pound into a plastic substrate (UPILEX-75s, UBE Industries), and the thickness of the polymer solution was uniformly adjusted using a film applicator, dried in a Matiz oven at 80° C. for 10 minutes, and then cured at 250° C. for 30 minutes under a nitrogen purge to obtain a PAI film having a thickness of 50.0 μm peeled from the substrate.

Example 5 parts by weight of pentaerythritol tetrakis(3-(3,5-di-tert-butyl-4-hydroxyphenyl)propionate (Irganox 1010) as an aromatic compound relative to 100 parts by weight of the poly(amide-imide) copolymer (Co-PM #2) obtained in Comparative Example 2 was dissolved in N,N-dimethylpropionamide to prepare an approximate 15 wt % polymer solution.

The polymer solution was poured into a plastic substrate (UPILEX-75s, UBE Industries), and the thickness of the polymer solution was uniformly adjusted using a film applicator, dried in a Matiz oven at 80° C. for 10 minutes, and then cured at 250° C. for 30 minutes under a nitrogen purge to obtain a PAI film having a thickness of 50.0 m peeled from the substrate.

Example 6

5 parts by weight of pentaerythritol tetras(3-(3,5-di-tert-butyl-4-hydroxyphenyl)propionate (Irganox 1010) as an aromatic compound relative to 100 parts by weight of the poly(amide-imide) copolymer (Co-PM #2) obtained in Comparative Example 2 was dissolved in N,N-dimethylpropionamide to prepare an approximate 15 wt % polymer solution.

The polymer solution was poured into a plastic substrate (UPILEX-75s, UBE Industries), and the thickness of the polymer solution was uniformly adjusted using a film applicator, dried in a Matiz oven at 60° C. for 20 minutes, and then cured at 250° C. for 30 minutes under a nitrogen purge to obtain a PAI film having a thickness of 50.0 μm peeled from the substrate.

Experimental Example (1) Retardation (Rth) in Thickness Direction with respect to a Wavelength of 550 nm The retardation (Rth) in the thickness direction was determined by directly using the polymer film (a length of 76 mm, a width of 52 mm, and a thickness of 13 μm) prepared in each of the examples and comparative examples as a measuring sample, using a measuring apparatus manufactured by AXOMETRICS, Inc. under the trade name of "AxoScan", inputting a value of a refractive index (the refractive index at a wavelength of 550 nm of the film obtained by the measurement of the refractive index described above) of each polymer film into the measuring apparatus measuring the thickness-direction retardation by using light at a wavelength of 590 nm under conditions of a temperature of 25° C. and humidity of 40%, and then converting the measured value of the thickness-direction retardation thus obtained (the value was measured according to the automatic measurement of the measuring apparatus) into a retardation value per 10 μm of the thickness of the film.

(2) Moisture Absorption Rate

The moisture absorption rate was calculated according to the following General Formula 1.

Moisture Absorption Rate (%)=($W1-W2$)*100/$W$[General Formula 1]

In General Formula 1, W1 is a weight measured by impregnating the aromatic poly(amide-imide) copolymer film in ultrapure water for 24 hours, and W2 is a weight measured by drying the aromatic poly (amide-imide) copolymer film at 150° C. for 30 minutes after the impregnation.

(3) UV-Cut Off Wavelength (λ) and UV-Cut Slope (dT/dλ)

The UV-cut off wavelength (λ) and UV-cut slope (dT/dλ) of the film were measured according to ASTM E424 using a UV-Vis spectrophotometer (manufacturer: Shimadzu, model name: UV2600).

The UV-cut slope (dT/dλ) was measured in the range of the transmittance of 10 to 80%, and the UV-cut slope (dT/dλ) was shown as the wavelength when the transmittance was less than 1%.

TABLE 1

|  | Thickness- direction retardation (Rth, nm) | Moisture absorption rate (%) | UV-cut slope (dT/dλ) |
| --- | --- | --- | --- |
| Comparative Example 1 | 2945 | 3.82 | 2.74 |
| Example 1 | 3551 | 3.38 | 2.94 |
| Example 2 | 3641 | 3.29 | 2.95 |
| Example 3 | 4205 | 2.83 | 2.97 |
| Comparative Example 2 | 2680 | 4.08 | 2.75 |
| Example 4 | 3344 | 3.47 | 2.87 |
| Example 5 | 3481 | 3.35 | 2.90 |
| Example 6 | 4057 | 2.91 | 2.93 |

Referring to Table 1 above, it was confirmed that the aromatic poly(amide-imide) copolymer films of the examples satisfying the physical properties that retardation (Rth) in the thickness direction with respect to a wavelength of 550 nm in an unstretched state was 3000 nm or more and a moisture absorption rate according to General Formula 1 is 3.6% or less had a relatively high UV-cut slope and thus had a colorless transparent optical characteristic together with an excellent L shielding function.

On the contrary, it was confirmed that the poly(amide-imide) copolymer films of the comparative examples had a relatively low UV-cut slope, and thus had low a W shielding function and the like.

The invention claimed is:

1. An aromatic poly(amide-imide) copolymer film, comprising:
   an aromatic poly(amide-imide) copolymer comprising a repeating unit derived from an aromatic diamine monomer, a repeating unit derived from an aromatic dianhydride monomer, and a repeating unit derived from an aromatic dicarbonyl monomer,
   wherein the aromatic poly(amide-imide) copolymer includes the repeating unit derived from the aromatic dicarbonyl monomer in an amount of 51 mol % or more based on the total moles of the repeating units derived from the aromatic dianhydride monomer and the aromatic dicarbonyl anomer,
   wherein retardation (Rth) in the thickness direction of the film as measured at a wavelength of 550 nm is 3000 nm or more, and a moisture absorption rate of the film according to General Formula 1 is 3.6% r, or less:

Moisture Absorption Rate (%)=($W1-W2$)*100/$W$[General Formula 1]

in the General Formula 1, W1 is a weight measured by impregnating the aromatic poly(amide-imide) copolymer film in ultrapure water for 24 hours, and
   W2 is a weight measured by drying the aromatic poly (amide-imide) copolymer film after at 150° (I for 30 minutes after the impregnation, and
   wherein the repeating unit derived from the aromatic dicarbonyl monomer contains 10 to 60 mol % of 4,4'-biphenyldicarbonyl repeating units, 10 to 50 mol % of isophthaloyl repeating units, and 20 to 70 mol % of terephthaloyl repeating units.

2. The aromatic poly(amide-imide) copolymer film according to claim 1, wherein
   the moisture absorption rate according to the General Formula 1 is 2.0 to 3.6%.

3. The aromatic poly(amide-imide) copolymer film according to claim 1, wherein
   a UV-cut slope (dT/dλ) of the film measured for a specimen having a thickness of 25 to 55 μm according to ASTM E424 is 2.80 or more in the range of transmittance of 10 to 80%.

4. The aromatic poly(amide-imide) copolymer film according to claim 1, wherein
   the aromatic diamine monomer includes 2,2'-bis(trifluoromethyl)-4,4'-biphenyldiamine, and
   the aromatic dianhydride monomer includes 3,3',4,4'-biphenyltetracarboxylic acid dianhydride or cyclobutane-1,2,3,4-tetracarboxylic dianhydride.

5. The aromatic poly(amide-imide) copolymer film according to claim 1, wherein
   the aromatic poly(amide-imide) copolymer film is dispersed in a polymer substrate containing the aromatic poly(amide-imide) copolymer, and further includes one or more aromatic compounds selected from the group consisting of 2-(2'-hydroxy-5'-tert-octylphenyl)benzotriazole and octadecyl-3-(3,5-di-tert-butyl-4-hydroxyphenyl)-propionate.

6. The aromatic poly(amide-imide) copolymer film according to claim 1, wherein
   the aromatic poly(amide-imide) copolymer film has retardation (Rth) in the thickness direction with respect to a wavelength of 550 nm in an upstretched state of 3000 nm or more.

7. The aromatic poly(amide-imide) copolymer film according to claim 1, wherein
   the aromatic poly(amide-imide) copolymer film has a thickness of 1 μm to 100 μm, and a haze of 2% or less and visible light transmittance of 98% or more.

8. A method for preparing the aromatic poly(amide-imide) copolymer film of claim 1, comprising the steps of: reacting an aromatic diamine monomer, an aromatic dianhydride monomer and an aromatic dicarbonyl monomer to form an aromatic poly(amide-imide) copolymer; and coating a coating solution formed by dissolving the aromatic poly(amide-imide) copolymer in an amide solvent containing an aliphatic group having 3 or more carbon atoms onto a substrate.

9. The method for preparing the aromatic poly(amide-imide) copolymer film according to claim 8, wherein the amide solvent containing the aliphatic group having 3 or more carbon atoms is 3-methoxy-N,N-dimethyl propionamide or N,N-dimethylpropionamide.

10. The method for preparing the aromatic poly(amide-imide) copolymer film according to claim 8, wherein the coating liquid formed by dissolving the aromatic poly(amide-imide) copolymer in an amide solvent containing an aliphatic group having 3 or more carbon atoms further includes one or more aromatic compounds selected from the group of 2-(2'-hydroxy-5'-tert-octylphenyl)benzotriazole and octadecyl-3-(3,5-di-tert-butyl-4-hydroxyphenyl)-propionate.

* * * * *